(12) United States Patent
Mohanasundaram et al.

(10) Patent No.: US 10,468,671 B2
(45) Date of Patent: Nov. 5, 2019

(54) COMPOSITIONS FOR PREPARING EXPANDER FREE ELECTRODES FOR LEAD ACID BATTERY AND PERFORMANCE THEREOF

(71) Applicant: INDIAN OIL CORPORATION LIMITED, Mumbai (IN)

(72) Inventors: Palvannan Mohanasundaram, Faridabad (IN); Bhanumurthy Samala, Faridabad (IN); Narayanam Seshubabu, Faridabad (IN); Amardeep Singh, Faridabad (IN); Naduhatty Selai Raman, Faridabad (IN); Sankara Sri Venkata Ramakumar, Faridabad (IN); Biswapriya Das, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 15/919,082

(22) Filed: Mar. 12, 2018

(65) Prior Publication Data
US 2018/0337397 A1    Nov. 22, 2018

(30) Foreign Application Priority Data
May 17, 2017    (IN) .............................. 201721017321

(51) Int. Cl.
*H01B 1/16* (2006.01)
*H01M 4/36* (2006.01)
(Continued)

(52) U.S. Cl.
CPC .............. *H01M 4/364* (2013.01); *H01B 1/16* (2013.01); *H01M 4/20* (2013.01); *H01M 4/22* (2013.01);
(Continued)

(58) Field of Classification Search
CPC ........ B82Y 30/00; B82Y 40/00; C08K 3/041; H01M 10/06; H01M 4/20; H01M 4/22; H01M 4/364; H01M 4/56; H01M 4/5825; H01M 4/625; H01M 4/627; H01M 4/628; Y10S 977/744; Y10S 977/842; Y10S 977/948; H01B 1/16
See application file for complete search history.

(56) References Cited

U.S. PATENT DOCUMENTS 4,594,301 A * 6/1986 Miyazaki ................ H01M 4/56
                                                                    423/619
7,070,753 B2    7/2006 Niu et al.
(Continued)

FOREIGN PATENT DOCUMENTS

CN    101320800 A    12/2008
CN    105355860 A *   2/2016 ........... Y02E 60/126
(Continued)

*Primary Examiner* — Mark Kopec
*Assistant Examiner* — Jaison P Thomas
(74) *Attorney, Agent, or Firm* — Maschoff Brennan

(57) ABSTRACT

The present invention deals with employing Heteroatoms namely Nitrogen, Sulphur intrinsic embedded carbon nanotubes (H-CNT) as multifunctional additive for preparing lead acid battery electrodes to substitute the expander chemicals namely, Vanisperse, Dinel Fibre, Barium sulphate and carbon black. Further the invention provides H-CNT in-situ produced from Crude oil or its products.

12 Claims, 5 Drawing Sheets

Figure 1A:
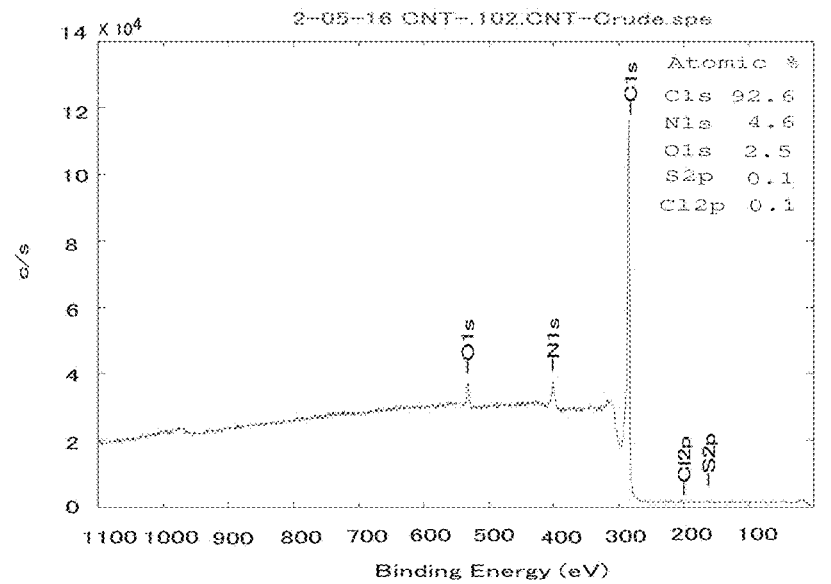
Figure 1A:
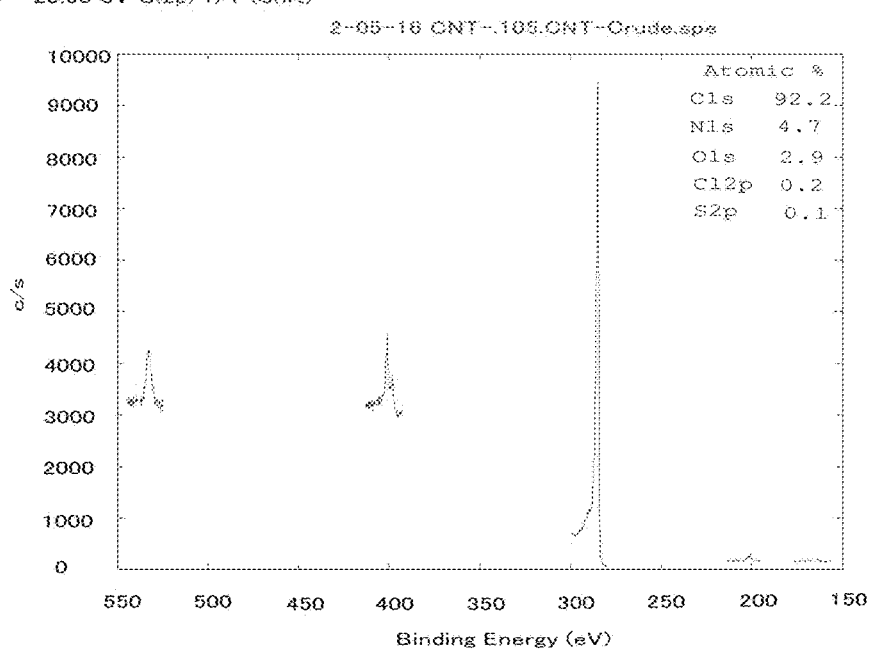

(51) Int. Cl.
*H01M 4/56* (2006.01)
*H01M 4/58* (2010.01)
*H01M 4/62* (2006.01)
*H01M 10/06* (2006.01)
*H01M 4/22* (2006.01)
*H01M 4/20* (2006.01)
*B82Y 30/00* (2011.01)
*B82Y 40/00* (2011.01)

(52) U.S. Cl.
CPC ........... *H01M 4/56* (2013.01); *H01M 4/5825* (2013.01); *H01M 4/625* (2013.01); *H01M 4/627* (2013.01); *H01M 4/628* (2013.01); *H01M 10/06* (2013.01); *B82Y 30/00* (2013.01); *B82Y 40/00* (2013.01); *Y10S 977/744* (2013.01); *Y10S 977/842* (2013.01); *Y10S 977/948* (2013.01)

(56) References Cited

U.S. PATENT DOCUMENTS

| | | |
|---|---|---|
| 2004/0160156 A1 | 8/2004 | Ohata et al. |
| 2012/0328940 A1 | 12/2012 | Bosnyak et al. |
| 2013/0344396 A1* | 12/2013 | Bosnyak ............ H01M 2/1653 429/307 |
| 2014/0162111 A1* | 6/2014 | Zimrin ................ B82Y 30/00 429/149 |
| 2015/0064538 A1* | 3/2015 | Bosnyak ............ H01M 2/1613 429/144 |
| 2015/0372289 A1* | 12/2015 | Korzhenko ............ H01M 4/20 429/228 |

FOREIGN PATENT DOCUMENTS

| | | |
|---|---|---|
| JP | 2008098009 A | 4/2008 |
| WO | 2013011516 A1 | 1/2013 |
| WO | 2015101917 A1 | 7/2015 |

* cited by examiner

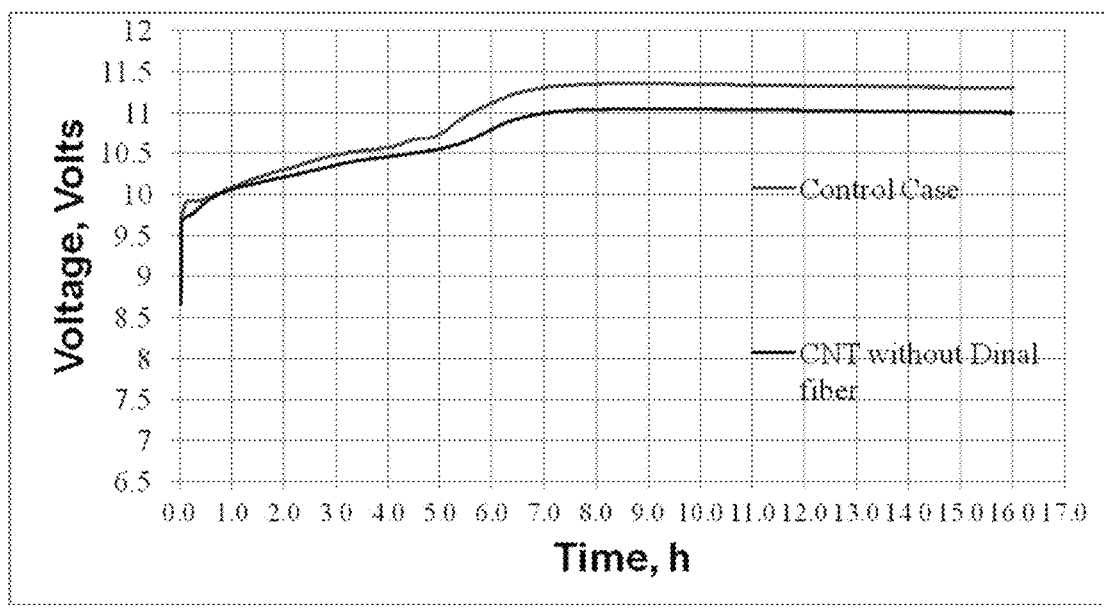
Fig. 10
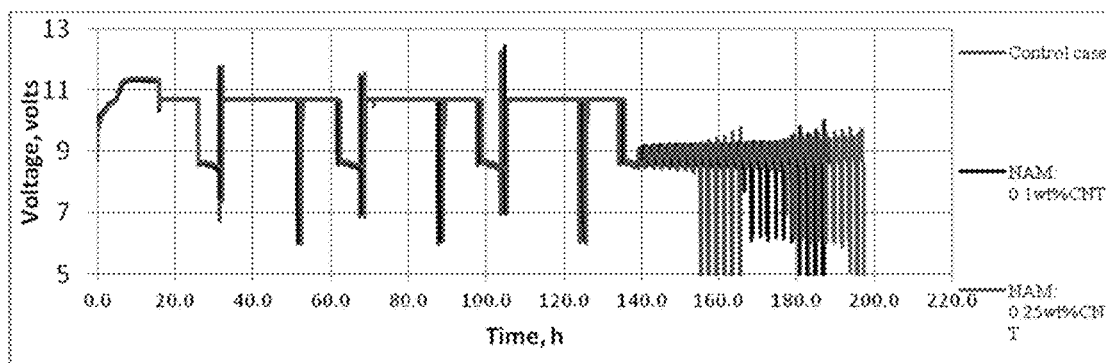
Fig. 11
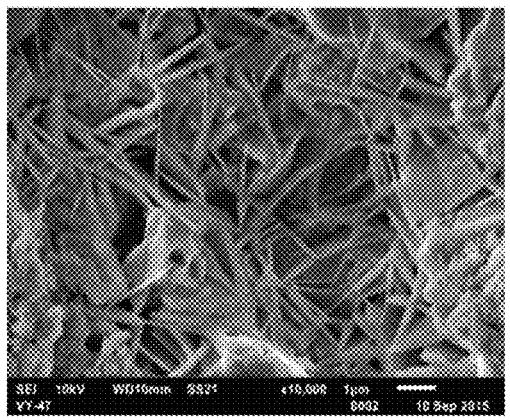 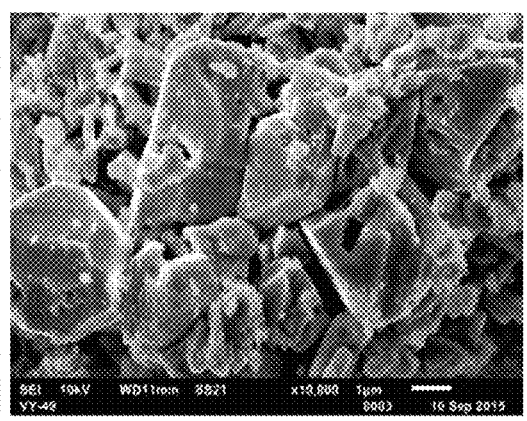
Fig. 12(a)　　　　　　　　　　Fig. 12(b)

COMPOSITIONS FOR PREPARING EXPANDER FREE ELECTRODES FOR LEAD ACID BATTERY AND PERFORMANCE THEREOF

FIELD OF THE INVENTION

The present invention relates to novel compositions and methods for producing lead-acid battery electrodes by employing heteroatoms intrinsic embedded carbon nanotubes. The heteroatoms are namely Nitrogen and Sulphur.

BACKGROUND OF THE INVENTION

Lead-acid batteries remain the main economic alternative as electric sources in most cars, trucks, buses, tractors, and motorcycles for many decades. The applications of these batteries vary from boats, planes, and submarines to electric cars and elsewhere.

In the conventional lead acid battery, the electromotive force being generated between lead and lead oxide in aqueous sulfuric acid by consuming sulfuric acid. Due to this, the production of lead acid battery by consuming huge kilograms of lead and additional metals as well as sulfuric acid as electrolyte and the disposal of waste materials makes the economic and environmental problems as grave yard.

Therefore, much effort had been introduced on developing technologies for recycling lead from used batteries which includes the reusing of the batteries or to extend their life-span, but these efforts have been less successful. The main reaction product, lead sulfate, which accumulates during this process, covers the plates and reduces the surface of the reactive materials, lowering the voltage and the capacity of the battery, increasing the cell internal resistance. The so-called sulfation process expands the sulfate deposits which lead to undesired crystallization of the deposits eventually to destroy the battery. Therefore, a lead-acid battery has a limited life-span of several years, usually between two and five years.

US20120328940 discloses Functionalized CNT having oxidation level of 1-15 wt % replacing only Carbon Black in NAM in lead acid batteries. Further it deals with sulfonated polymer used as surfactant for dispersing the CNT in lead oxide matrix.

US20040160156A1 disclosed for preparation of master batch mixture of resin component namely, polyvinylidiene fluoride used in electrode.

WO2013011516 deals with functionalized carbon nanotube and composite with conductive polymers used in Lead acid battery electrode.

U.S. Pat. No. 7,070,753 B2 deals with modification of CNT using oxidation with peroxygen compounds. JP 2008098009 deals with carbon black and CNT, Nanocarbon mixture in positive electrode.

None of the above said patents deal with CNT used as multifunctional additive in Lead acid battery electrodes.

CN101320800 disclosed CNT mixed with surfactants (Sodium dodehyl benzene sulphonate, Poly Vinyl alcohol) into Poly acrylo nitrile stable fibre and lead oxide as active material used. Further Ball mill is used for size reduction.

WO2015101917 A1 disclosed for simultaneous production of carbon nanotube, Hydrogen and lighter hydrocarbons from crude oil and its products using vibrating reactor.

SUMMARY OF THE INVENTION

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

The present invention as embodied and broadly described herein discloses an expander free electrode for lead acid battery and a process for preparing an expander free electrode. The electrode as proposed in the present invention comprises heteroatom embedded carbon nanotube (H-CNT) and lead oxide. The resultant electrode obtained through the process of the present invention results in effectively overcoming the problem of lead sulfate accumulation during battery operation, as well as improved expander formulations providing improved battery capacity, efficiency, performance and life for lead-acid batteries of various types.

Accordingly, an aspect of the present invention is to provide an expander free electrode for lead acid battery comprising heteroatom embedded carbon nanotube (H-CNT) and lead oxide. Further the heteroatom embedded carbon nanotube (H-CNT) is present in the range of 0.001 wt % to 1 wt %. Further the heteroatom embedded carbon nanotube (H-CNT) comprises sulphur in the range of 0.001 wt % to 1 wt %. Further the heteroatom embedded carbon nanotube (H-CNT) comprises nitrogen in the range of 0.01 ppm to 2000 ppm. The electrode as disclosed in the present invention has lead sulphate crystallite size in the range of 480 Å to 550 Å and penetration in the range of 3 dmm to 7 dmm.

Another aspect of the present invention is to provide a process for preparing an expander free electrode composition for lead acid battery comprising drop wise addition of water to lead oxide to obtain lead oxide-water paste, dispersion of the heteroatom embedded carbon nanotube (H-CNT) in sulphuric acid, and mixing the product as obtained with lead oxide-water paste. Obtained mixture is then applied in grid and cured for 72 hours to obtain expander free electrode for lead acid battery.

Another aspect of the present invention is to provide a process for preparation of hetero atoms intrinsic embedded Carbon Nano Tube (H-CNT) from crude oil or its products that can be employed as multi-functional additive in lead acid battery electrodes.

Another aspect of the present invention is to provide a lead acid battery comprising one or more expander free electrodes as disclosed in present invention.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

The inventors have surprisingly found that Hetero atoms (Nitrogen, Sulphur) intrinsic embedded Carbon Nano Tube (H-CNT) act as a multi functional additive for use as electrode materials in electrochemical cells such as lead-acid batteries which are capable of surviving the acidic conditions in the battery, e.g., lead acid cell.

OBJECT OF THE INVENTION

It is the primary object of the invention to disclose the Expander free electrodes using H-CNT as multi-functional additive.

It is further object of the invention to disclose the process for preparing expander free electrodes by using H-CNT for lead acid battery with dilute sulphuric acid.

BRIEF DESCRIPTION OF THE ACCOMPANYING DRAWINGS

Figure 1B:
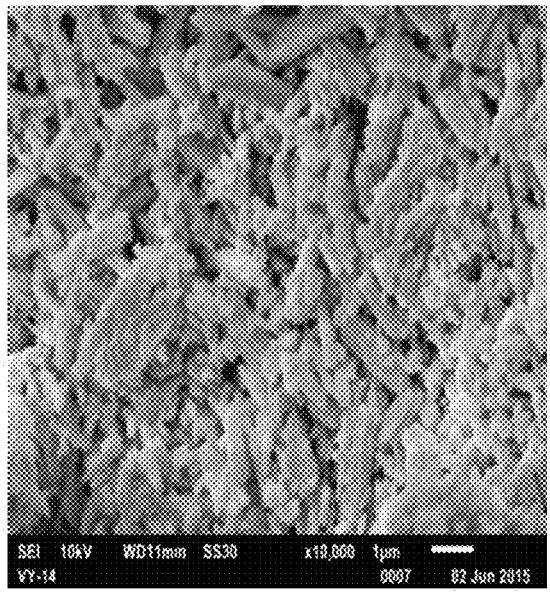
Figure 2:
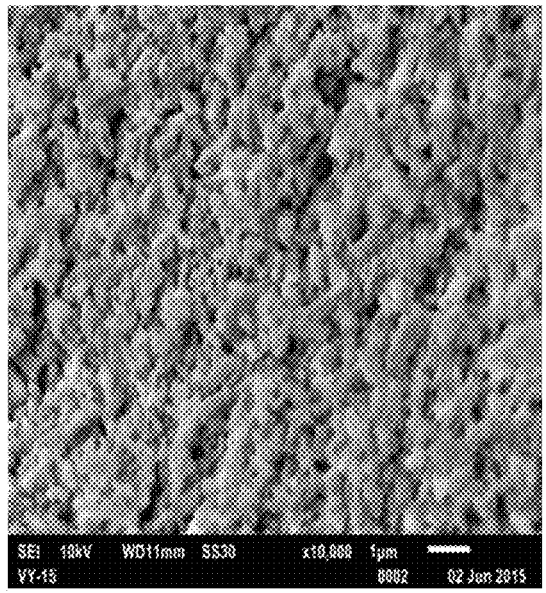
Figure 3:
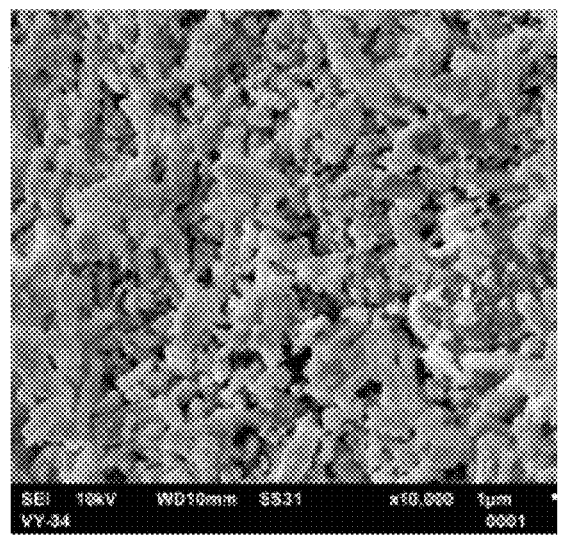
Figure 4:
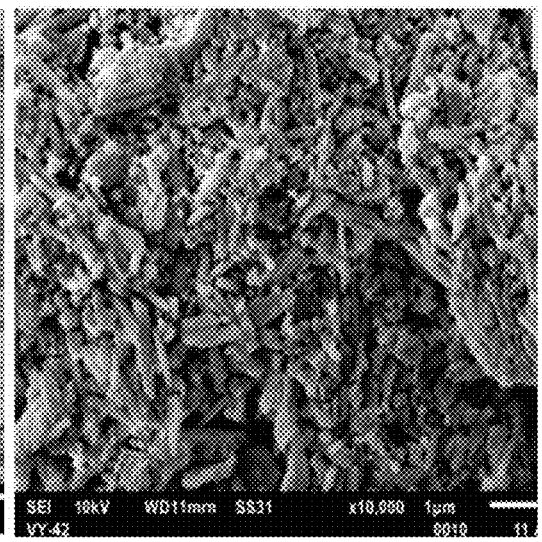

FIG. 1(a) CNT intrinsic embedded with hetero atoms, Nitrogen and Sulphur (H-CNT)-XPS
FIG. 1(b):Carbon Black base Control-NAM
FIG. 2: H-CNT without CB-NAM
FIG. 3: H-CNT without CB and V-NAM
FIG. 4: H-CNT without CB, V and DF-NAM
FIG. 5: Mapping of H-CNT in Cured Lead oxide Matrix
FIG. 6: SEM Image of Barium sulphate
FIG. 7: SEM Image of H-CNT
FIG. 8: Reserve capacity of Expander doped Base Control case Vs H-CNT doped without different expander:
(1) Expander doped Control (CB-NAM)
(2) 0.15% H-CNT NAM without CB (38.5% increase)
(3). 0.35% H-CNT NAM without CB&V (62% increase)
(4) 0.35% H-CNT NAM Without CB, V and H-CNT PAM (68.8% increase)
(5) H-CNT 1% NAM H-CNT PAM Without CB, V, BS & DF (71.31% increase)
FIG. 9: AH output with respect to cycles
(1) Control with Expanders
(2) 0.35% H-CNT NAM Without CB and V
(3) H-CNT 1% NAM H-CNT PAM Without CB and V
FIG. 10: Battery formation curve for H-CNT without DF Vs Control case
FIG. 11: Cycle life Test at 50% SOC
FIG. 12: SEM images of NAM after Life cycle test
(a) After life cycle-Control
(b) After Life cycle-H-CNT

DETAILED DESCRIPTION OF THE INVENTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The terminology and structure employed herein is for describing, teaching and illuminating some embodiments and their specific features and elements and does not limit, restrict or reduce the scope of the claims or their equivalents.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs.

The system, methods, and examples provided herein are illustrative only and not intended to be limiting. Embodiments of the present invention will be described below in detail with reference to the accompanying drawings.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

In an embodiment, expander free electrode for lead acid battery comprises heteroatom embedded carbon nanotube (H-CNT) and lead oxide.

According to an aspect of the present subject matter, in said embodiment the heteroatom embedded carbon nanotube (H-CNT) is present in the range of 0.001 wt % to 1 wt %.

According to an aspect of the present subject matter, in said embodiment the heteroatom embedded carbon nanotube (H-CNT) comprises sulphur in the range of 0.001 wt % to 1 wt %.

According to an aspect of the present subject matter, in said embodiment the heteroatom embedded carbon nanotube (H-CNT) comprises nitrogen in the range of 0.01 ppm to 2000 ppm.

According to an aspect of the present subject matter, in said embodiment the electrode is having lead sulphate crystallite size in the range of 480 Å to 550 Å and penetration in the range of 3 dmm to 7 dmm.

In another embodiment, a process for preparing an expander free electrode composition for lead acid battery comprises, step (a) adding water drop wise to lead oxide to obtain lead oxide-water paste; step (b) dispersing the heteroatom embedded carbon nanotube (H-CNT) in sulphuric acid; step (c) mixing the product as obtained in step (b) with lead oxide-water paste of step (a) and step (d) applying the product of step (c) in grid and curing for 72 hours to obtain expander free electrode for lead acid battery.

According to an aspect of the present subject matter, in said embodiment the dispersion is done by sonification.

According to an aspect of the present subject matter, in said embodiment the process is performed at a temperature in the range of 40° C. to 50° C.

According to an aspect of the present subject matter, in said embodiment the heteroatom embedded carbon nanotube (H-CNT) is produced from crude oil or its products or mixture thereof.

According to an aspect of the present subject matter, in said embodiment the crude oil or its products or mixture thereof comprises sulphur is in the range of 0.001 wt % to 5 wt %.

According to an aspect of the present subject matter, in said embodiment the crude oil or its products or mixture thereof comprises nitrogen is in the range of 0.01 ppm to 5000 ppm.

According to an aspect of the present subject matter, in said embodiment the heteroatom embedded carbon nanotube (H-CNT) comprises sulphur in the range of 0.001 wt % to 1 wt %.

According to an aspect of the present subject matter, in said embodiment the heteroatom embedded carbon nanotube (H-CNT) comprises nitrogen in the range of 0.01 ppm to 2000 ppm.

In yet another embodiment, a lead acid battery comprises one or more expander free electrode as disclosed in present invention.

The electrode discussed above is not limited only to battery applications. In one or more embodiments described herein, the electrode may be either an anode electrode carrying a positive charge or a cathode electrode carrying a negative charge. The electrode can be any type of an electrical conductor through which electricity enters or leaves an object, substance, or region. In one or more embodiments described herein, the electrode may or may not be in contact with either a metallic or non-metallic part of a circuit.

In yet another embodiment, the present invention deals with process for in-situ preparation of Hetero atoms, namely nitrogen and sulphur, intrinsic embedded Carbon Nano Tube (H-CNT) from Crude oil or its products or mixture thereof comprising catalytic conversion of crude oil or its products which contains heteroatomic molecules in the range of 0.001 wt % to 5 wt %.

According to an aspect of the present subject matter, in said embodiment the crude oil or its products inherently contains 0.2 wt % of nitrogen and 2.1 wt % of sulphur.

According to an aspect of the present subject matter, in said embodiment the catalytic conversion of crude oil or its products takes place in a reactor which is operating at three temperature zones maintained at about 625° C., 650° C. and 675° C. The reactor is operated at pressure of about 1 atmospheric.

According to an aspect of the present subject matter, in said embodiment the catalyst is initially reduced in presence of hydrogen gas and thereafter the crude oil is fed into the reactor. Preferred catalyst for preparation of Hetero atoms, namely nitrogen and sulphur, intrinsic embedded Carbon Nano Tube (H-CNT) is magnesia supported iron-cobalt.

Simultaneous production of Carbon nanotube and product gas from crude oil and its products or mixture thereof with intrinsic heteroatomic growth promoters can be prepared by the process as described in PCT patent application WO 2015/10917 A1, hereby incorporated by reference.

The presence of hetero atoms particularly nitrogen and sulphur intrinsically embedded in the CNT matrix facilitates the availability of lone pair of electrons for higher electrical conductivity, electro chemical capacitance etc.

According to one of main embodiments, the present invention deals with H-CNT as a multifunctional additive as nucleation agent, crystallite size reduction additive, conductive sulfation reduction additive and conductive hardness improving additive.

According to the further embodiment of the present invention, it covers the process for preparing the expander free Electrodes for Lead acid battery using Heteroatoms namely Nitrogen, Sulphur intrinsic embedded Carbon Nano Tube as Multifunctional Additive and improved performance of Lead acid battery thereof which includes H-CNT mixed in grey oxide for obtaining uniform dispersion.

Further present invention discloses process for H-CNT mixed in grey oxide for obtaining uniform dispersion. In general CNT dispersed in grey oxide (lead oxide) using surfactants or by introducing reactive groups (functionalization) in the surface of CNT. But surfactants/functionalization of CNT hinders the CNT characteristics and interaction between the CNT and grey oxide. The present invention overcomes the above said problem by using H-CNT in grey oxide by dispersing H-CNT in sulphuric acid and mixing with grey oxide. The preparation of negative electrode of grey oxide paste by following steps: 1. The grey oxide (lead oxide) powder mixed with expanders 2. Water is added, and then sulphuric acid is added for making the paste. The present invention discloses the H-CNT is dispersed in Sulphuric acid using sonification and mixed with grey oxide-water paste for preparing the uniform distribution of H-CNT in grey oxide paste. The above said process distributes the H-CNT in uniform in the grey oxide paste due to H-CNT having higher affinity towards sulphuric acid. So H-CNT dispersed in Sulphuric acid for preparing Negative Active Material (NAM) and Positive Active Material (PAM). Generally the surfactant or external functional groups deteriorate the CNT inherent structure and properties. The present invention does not use any surfactant or external agent to distribute H-CNT in uniform way in Negative Active Material (NAM) and PAM. The above said process allows that the H-CNT retains its inherent properties in Negative Active Material (NAM) and Positive Active Material (PAM).

In general CNT is dispersed in grey oxide using surfactants or by introducing reactive groups in the surface of CNT. But surfactants/functionalization of CNT hinders the inherent CNT characteristics and interaction between the CNT and grey oxide. The present invention overcomes the above said problem by using H-CNT in grey oxide by dispersing H-CNT in sulphuric acid and mixing with grey oxide.

For preparation of negative electrode the grey oxide paste is prepared by following steps:
1. The grey oxide (lead oxide) powder is mixed with expanders,
2. Water is added, and then sulphuric acid is added for making the paste.

The present invention discloses that the H-CNT is dispersed in Sulphuric acid using sonification and mixed with grey oxide-water paste for obtaining a uniform distribution of H-CNT in grey oxide paste. The above said process distributes the H-CNT uniformly in the grey oxide paste due to H-CNT having higher affinity towards sulphuric acid. So sulphuric acid is used for dispersing the H-CNT in Negative Active Material (NAM) and Positive Active Material (PAM). Generally the surfactant or external functional groups deteriorate the CNT inherent structure and properties. The present invention does not use any surfactant or external agent to distribute H-CNT uniformly in Negative Active Material (NAM) and Positive Active Material (PAM). The above said process allows the H-CNT to retain its inherent properties in NAM.

Example 6 illustrates the preparation of negative electrode using H-CNT simultaneously without using of carbon black, Dinel fibre and vanisperse. The cured sample is subjected to mapping of Carbon in Negative active material. (source of carbon only from H-CNT).

Figure 5:
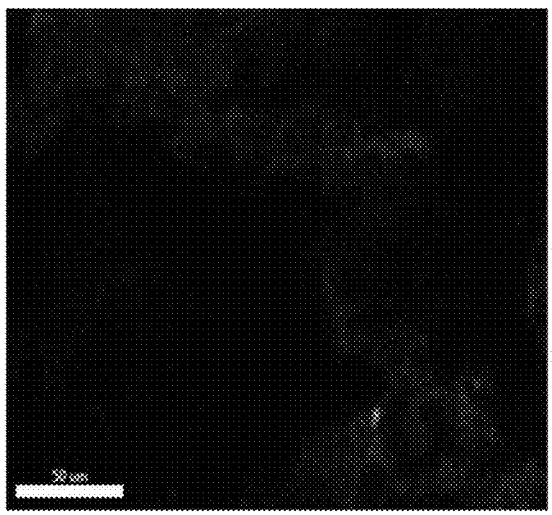

FIG. 5 illustrates that the Scanning Electron Microscope (SEM) mapping images ensures that the H-CNT (Green colour represents FIG. 5) uniformly distributed in Negative Active Material (NAM).

According to the further embodiment, the present invention deals with H-CNT which acts as crystallite size reduction agent. Generally, Vanisperse (ligno sulfonate) is used for increasing the surface area of negative active material.

H-CNT easily percolates the negative active material layer and prevents the growth of lead sulphate and leads the crystallite size reduction due to high Length to diameter ratio and hence improves the surface area of Negative Active Material (NAM).

One preferred embodiment of the present invention is that H-CNT inhibits the crystallite growth of lead sulphate in negative active material during curing step. In general the organic ligno cellulose additive namely vanisperse is added in Negative Active Material (NAM) to increase the surface area of lead sulphate and life cycle improvement of battery. The present invention discloses that the H-CNT not only replaces the role of Vanisperse but it inhibits the crystallite growth of Lead sulphate in NAM and hence increases the surface area of NAM and prevents the sulfation in NAM and further provides improved performance of NAM and improves the lead acid battery performance namely reserve capacity and life cycle improvement etc as compared to vanisperse doped NAM.

Examples 2 to 5 show preparation of Negative Active Material (NAM) using H-CNT without expanders (2. carbon black (CB), 3. CB and Vanisperse (V), 4. CB, V and Dinel Fibre (DF), 5. CB, V, DF and barium sulphate). Table 1 illustrates that CNT reduces the crystallite size of NAM by X-ray Diffraction (XRD) by sherror formula up to 32% over control NAM. According to the other preferred embodiment, the present invention deals with H-CNT which acts as a conductive hardness improving agent in electrode.

Generally, the dinel fibres are used for improving the hardness of the electrodes in Lead acid batteries and it is an insulating material. It offers more charging resistance to lead acid battery. Dinel fibre is deteriorating the electrical conductivity of Negative Active Material (NAM) and Positive Active Material (PAM) matrix in lead acid batteries.

H-CNT is having high L/D ratio which simultaneously is also having good electrical conductivity. Instead of Dinel fibre, H-CNT has been used in Lead acid battery electrodes since it is improving the hardness as well as electrical conductivity of the Negative Active Material (NAM) and Positive Active Material (PAM).

From the data disclosed in Tables 3 and 4, it is evident that the H-CNT improves the hardness of the electrode with decreasing penetration point up to 80% as per ASTM D5-13 by comparison with dinel fibre. Further Example 13 and FIG. 10 illustrates the battery formation curves of H-CNT in Negative Active Material (NAM) without Dinel fibre and control case (constant current charging).

For H-CNT case (without Dinel fibre) the maximum voltage reached is less (11.0 Volts) than the control with Dinel fibre (11.4 Volts) case. It indicates H-CNT is simultaneously increasing the hardness as well as charging conductivity or decreasing the charging resistance of the electrodes).

According to the preferred embodiment, the present invention deals with H-CNT which acts as a Nucleation agent. The function of the barium sulphate in negative plate acts as a nucleating agent for lead sulphate crystals.

In general, barium sulphate comprises both blanc fixe and barite forms. It is desirable that the nucleation additive is having very small particle in size in the order of few nano meters to micron and uniform in size, so that very large number of small seed crystals is implanted in the negative active material.

Generally, the barium sulphate crystal particle size varies from 500 nm to 5 microns and is in non-uniform size and unstructured morphology. But the size of H-CNT varies from 1-50 nm diameter and length varies between 200 nm to 7 microns and is uniform in size and has structured morphology. Due to its superior structured morphology, uniform and nano size, H-CNT is very suitable nucleating agent compared to barium sulphate.

Due to lower in size it effectively penetrates the negative active material and this ensures that the lead sulphate crystals growing on H-CNT nuclei are small and uniform size and structured morphology over barium sulphate and further ensures that large numbers of small seed crystals are implanted in the negative active material.

Example 10 illustrates that Scanning electron microscope (SEM) images of H-CNT has structured and less diameter (20-30 nm) nuclei as compared to unstructured and non uniform bigger particle size (500 nm) of barium sulphate.

One more aspect of the present invention discloses that H-CNT prevents the sulfation in NAM and thus improves the life cycle of battery. In general Carbon black is used in Negative Active Material (NAM) to prevent the sulfation and increase the lifecycle by improving the electrical conductivity of the Negative electrode. In the present invention H-CNT replaces the carbon black in NAM and provides improvement in performance of battery with better life cycle and more charge acceptance as compared to carbon black doped NAM in lead acid batteries. Example 14 and FIG. 12 illustrate that H-CNT doped in NAM maintained its lead sulfate crystal structure and reduced the sulfation as compared to the control case.

One more preferred embodiment of the present invention deals with process for preparing expander free electrodes using H-CNT as multifunctional additive. Examples 2 to 6 illustrate H-CNT as multifunctional additive for preparing the expander free Negative electrode and Positive electrode.

Figure 8:
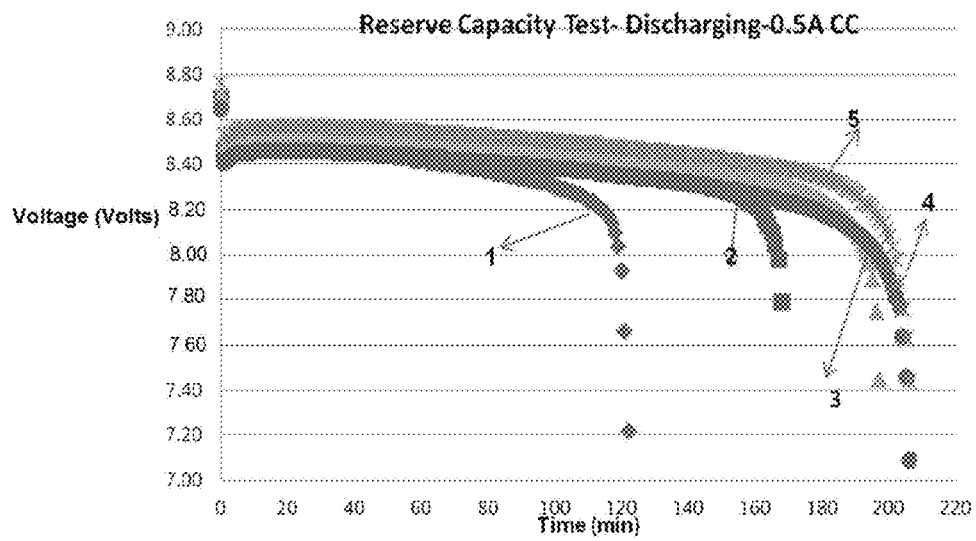

One more preferred embodiment of the present invention deals with the reserve capacity of H-CNT doped expander free lead acid battery, which increases as compared to control battery. The reserve capacity increases due to H-CNT dispersed in Negative Active Material (NAM) uniformly using sulphuric acid and H-CNT maintained the structure, morphology and improved the electrochemical performance of pseudo capacitance and Electric double layer capacitance of the lead acid battery negative active material due to its heteroatoms namely nitrogen and sulphur intrinsic embedded in the Carbon Nanotube. The Example 11 and FIG. 8 illustrate that the lead acid battery NAM with various compositions of H-CNT and without different expander show the reserve capacity improvement up to 75% compared to expander doped control lead acid battery.

One more preferred embodiment of the present invention provides H-CNT doped expander free lead acid battery having improved performance over the control expander doped battery due to H-CNT acting as multifunctional additive like crystallite size reduction additive, conductive hardness improving additive, conductive sulfation reduction additive and nucleation agent.

Example 14, FIG. 11, Table 5 & 6 illustrate the High rate of discharge capacity of H-CNT doped expander free lead acid battery up to 30% more than control expander doped lead acid battery. Further the life cycle improved up to 220% over control expander doped lead acid battery.

EXAMPLE A

The petroleum crude oil inherently containing 0.2 wt % Nitrogen and 2.1 wt % Sulphur was fed into a Vertical reactor with flow rate of 0.5 ml/min. 2 g of Magnesia supported iron-cobalt catalyst was loaded in the vertical reactor. The operating temperature was maintained for three temperature zones 625° C., 650° C., 675° C. and 1 atmospheric pressure. The catalyst is initially reduced in the presence of hydrogen gas with flow rate of 100 sccm for 2 hours at operating temperature. After completion of catalyst reduction the petroleum crude oil was fed into the reactor with the help of pump at a flow rate of 30 ml/hr for eight hours in the presence of Nitrogen carrier gas. The obtained CNT from the process intrinsically embedded Nitrogen and Sulphur in the CNT Matrix as confirmed by XPS. It is shown in FIG. 1(a).

EXAMPLE 1

Base Control Negative Active Material Preparation:

500 g lead oxide (gray oxide) is mixed with expanders as 0.75 g of carbon black, 0.5 g of Dinel fibre, 1 g of Vanisperse and 4 g of barium sulphate. The gray oxide with expanders is mixed using rotating mixer. Then 55 ml of water is added drop by drop within two minutes. Then 27 ml Sulphuric acid is added drop by drop within 10 minutes. The process temperature is maintained between 40-50° C. The paste is thoroughly mixed. The negative electrode is prepared using 17.6 g negative paste applied in grid and allowed for 72 hours curing.

H-CNT Negative Active Material (NAM) Preparation

EXAMPLE 2

500 g lead oxide (gray oxide) is mixed with 0.5 g Dinel fibre, 1 g Vanisperse and 4 g barium sulphate. The gray oxide mixture is mixed using rotating mixer. Then 55 ml water is added drop by drop within two minutes. 0.75 g of H-CNT is dispersed in 27 ml sulphuric acid with specific gravity of 1.4 using sonification for 15 minutes. The dispersed H-CNT in sulphuric acid is added drop by drop within 10 minutes. The process temperature is maintained between 40-50° C. The paste is thoroughly mixed. The H-CNT doped negative electrode without carbon black, is prepared using 17.6 g negative paste applied in grid and allowed for 72 hrs curing.

EXAMPLE 3

500 g lead oxide (gray oxide) is mixed with 0.5 g Dinel fibre, and 4 g barium sulphate. The gray oxide mixture is mixed using rotating mixer. Then 55 ml water is added drop by drop within two minutes. 1.75 g of H-CNT is dispersed in 27 ml sulphuric acid with specific gravity of 1.4 using sonification. The dispersed H-CNT in sulphuric acid is added drop by drop within 10 minutes. The process temperature is maintained between 40-50° C. The paste is thoroughly mixed. The H-CNT doped negative electrode without carbon black and Vanisperse, is prepared using 17.6 g negative paste applied in grid and allowed for 72 hrs curing.

EXAMPLE 4

500 g lead oxide (gray oxide) is mixed with 4 g barium sulphate. The gray oxide mixture is mixed using rotating mixer. Then 5 ml water is added drop by drop within two minutes. 2.25 g of H-CNT is dispersed in 27 ml sulphuric acid with specific gravity of 1.4 using sonification. The dispersed H-CNT in sulphuric acid is added drop by drop within 10 minutes. The process temperature is maintained between 40-50° C. The paste is thoroughly mixed. The CNT doped negative electrode without carbon black, Vanisperse and Dinel fibre is prepared using 17.6 g negative paste applied in grid and allowed for 72 hrs curing. The Mapping of H-CNT (Carbon) using Scanning Electron Microscope (SEM) is given in FIG. 5 for uniform dispersion of H-CNT in Lead oxide Matrix.

EXAMPLE 5

500 g lead oxide (gray oxide) is mixed with 55 ml water which is added drop by drop within two minutes. 2.5 g of H-CNT is added in 27 ml sulphuric acid and it is kept for 15 minutes for ultrasonification. The dispersed H-CNT in 27 ml sulphuric acid with specific gravity of 1.4 is added drop by drop within 10 minutes. The process temperature is maintained between 40-50° C. The paste is thoroughly mixed. The H-CNT doped negative electrode without barium sulphate, carbon black, Vanisperse and Dinel fibre is prepared using 17.6 g negative paste applied in grid and allowed for 72 hrs curing.

EXAMPLE 6

500 g lead oxide (gray oxide) is mixed with 0.5 g Dinel fibre, 1 g Vanisperse, 0.40 g H-CNT and 4 g barium sulphate. The gray oxide mixture is mixed using rotating mixer. Then 55 ml water is added drop by drop within two minutes. Then 0.35 g H-CNT dispersed in 27 ml sulphuric acid is added drop by drop within 10 minutes. The process temperature is maintained between 40-50° C. The paste is thoroughly mixed. The H-CNT doped negative electrode with Dinel fibre, barium sulphate and vanisperse is prepared using 17.6 g negative paste applied in grid and allowed for 72 hrs curing.

After curing the Negative active material is analyzed using Scanning Electron Microscope (SEM) for Surface morphology and X-ray Diffraction (XRD) analysis for lead sulphate (Tri basis lead sulphate) Crystallite Size. The Scanning Electron Microscope (SEM) morphology images are given in FIGS. 1 to 4 and Crystallite Size is given in Table 1.

TABLE 1

NAM Crystallite size of Lead sulphate (Tribasic lead sulphate) by XRD

| Items | Crystallite size- (A) | Percentage decrease of crystallite size over Expanders doped |
|---|---|---|
| 1 Carbon Black-Expanders doped-NAM | 710 | |
| 2 H-CNT without CB-NAM | 550 | 22.53 |
| 3 H-CNT without CB and V-NAM | 480 | 32.39 |
| 4 H-CNT without CB, DF and V-NAM | 480 | 32.39 |

Further the cured negative electrodes are subjected to penetration point. Penetration point is a measure of hardness of the material. If penetration point is low hardness of the material is high. The Penetration point results are shown in Table 2.

TABLE 2

Penetration point of Negative electrodes

| Items | Penetration Point (dmm) ASTM-D5-13/ IS1203 | Percentage decrease in penetration point Over base control |
|---|---|---|
| 1 Carbon Black-Base control- | 15 | |
| 2 H-CNT without CB | 7 | 53.33 |
| 3 H-CNT without CB and V | 3.5 | 76.66 |
| 4 H-CNT without CB, V, and DF | 3 | 80 |

EXAMPLE 7

Preparation of Base Control Positive Electrode 500 g lead oxide (gray oxide) is mixed with 0.5 g Dinel fibre and then 67.5 ml water is added drop by drop within two minutes. Then 39 ml of sulphuric acid with specific gravity of 1.4 is added drop by drop within 10 minutes. The process temperature is maintained between 40-50° C. The paste is thoroughly mixed. The Dinel Fibre doped Positive electrode is prepared using 17.6 g positive active material paste applied in grid and allowed for 72 hrs curing.

EXAMPLE 8

Preparation of H-CNT Doped Positive Electrode

To 500 g lead oxide (gray oxide) 67.5 ml water is added drop by drop within two minutes. 0.80 g of H-CNT is dispersed in 39 ml of sulphuric acid and kept 30 minutes for sonification. The dispersed H-CNT in 39 ml of sulphuric acid with specific gravity of 1.4 is added drop by drop within 10 minutes. The process temperature is maintained between 40-50° C. The paste is thoroughly mixed. The H-CNT doped Positive electrode is prepared using 17.6 g positive active material paste applied in grid and allowed for 72 hrs curing. 17.6 g positive active material paste applied in grid and allowed for 72 hrs curing.

EXAMPLE 9

500 g lead oxide (gray oxide) is mixed with 0.5 g Dinel fibre and then 67.5 ml water is added drop by drop within two minutes. 0.80 g of H-CNT is dispersed in 39 ml of sulphuric acid using sonification. The dispersed H-CNT in 39 ml of sulphuric acid with specific gravity of 1.4 is added drop by drop within 10 minutes. The process temperature is maintained between 40-50° C. The paste is thoroughly mixed. The H-CNT doped Positive electrode is prepared using 17.6 g positive active material paste applied in grid and allowed for 72 hrs curing. After curing the Positive active material is analyzed using X-ray Diffraction (XRD) analysis for lead sulphate (Tri basic lead sulphate) Crystallite Size shown in Table 3.

TABLE 3

Positive Active Material (PAM) Crystallite Size of Lead Sulphate by XRD

| Items | Crystallite size- (A) | Percentage decrease of crystallite size over base control(expanders doped) |
|---|---|---|
| 1 Positive Active Material- Base Control | 660 | |
| 2 H-CNT-Positive Active material | 520 | 21.21 |

TABLE 4

Penetration point of Positive electrodes

| Items | Penetration Point (dmm) ASTM-D5-13/ IS1203 | Percentage decrease in penetration point Over base control |
|---|---|---|
| 1 Base Control Positive Electrode | 11 | |
| 2 H-CNT Positive Electrode | 5 | 54.54 |

EXAMPLE 10

Figure 6:
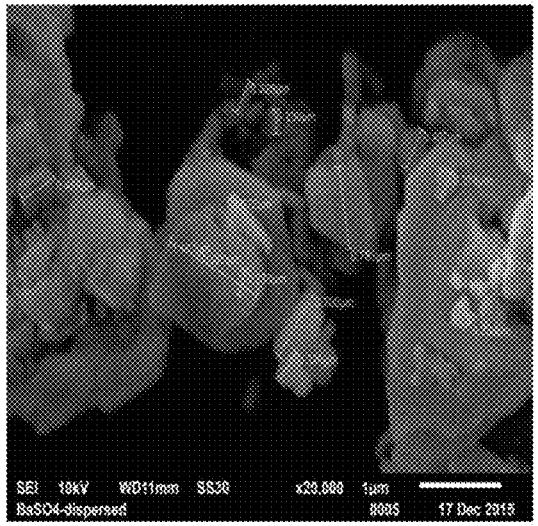
Figure 7:
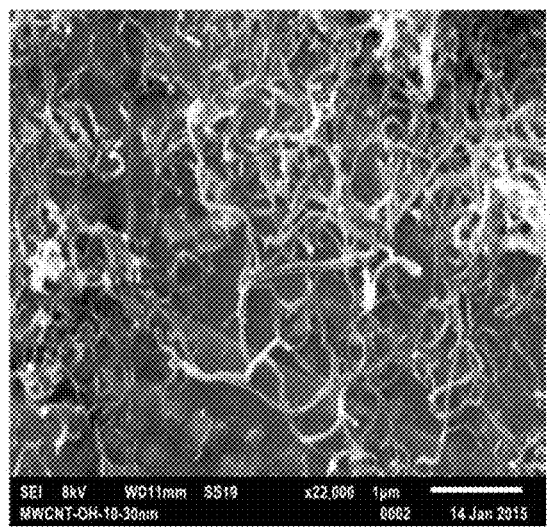

Scanning Electron Microscope (SEM) images of Barium Sulphate Vs H-CNT are shown in FIG. 6 and FIG. 7.

EXAMPLE 11

Four Single cell lead acid batteries constructed using each single cell consists of 2 normal positive cured plates and 1 H-CNT doped negative cured plate dipped in sulphuric acid with the specific gravity of 1.28 to study the effect of Negative plate. The battery is charged using 0.5 A constant current for 24 hours using battery tester. Then rested for 1 hr. Then discharged using constant current 0.5 A up to cutoff voltage 7. The time taken for to reach the cutoff voltage is noted. The above said experiments are repeated for expander doped base control negative cured plate, 0.15 wt % H-CNT doped Negative cured plate without Carbon black, 0.35 wt % H-CNT without carbon Black and Vanisperse, 1 wt % H-CNT without Carbon black, Vanisperse, Barium sulphate and Dinel Fibre, The Reserve capacity of Control and H-CNT doped negative electrodes of lead acid battery is shown in FIG. 8, Table 4.2.

TABLE 4.2

| S.No | Description | % increase in Reserve capacity as compared to Control |
|---|---|---|
| 1 | 0.15% H-CNT in NAM without CB | 38.5 |
| 2 | 0.35% H-CNT in NAM without CB & V | 62 |
| 3 | 0.35% H-CNT in NAM without CB & V and 0.15% H-CNT in PAM | 68.8 |
| 4 | 1% H-CNT in NAM Without CB, V, BS & DF and 0.15% H-CNT in PAM | 71.3 |

EXAMPLE 12

Figure 9:
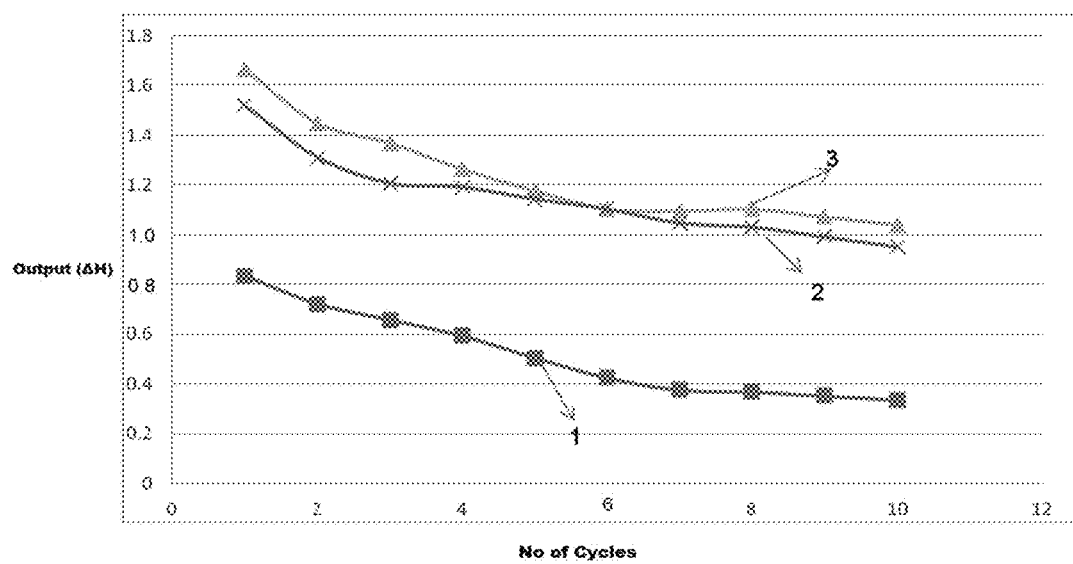

Four Single cell lead acid batteries constructed using each single cell consists of 2 positive cured plates and 1 negative cured plate dipped in sulphuric acid with the specific gravity of 1.28 to study the effect of Negative plate. The battery is charged using 0.5 A constant current for 24 hours using battery tester. Then rested for 1 hr. Then discharged using constant current 0.5 A up to cutoff voltage 7. The time taken for to reach the cutoff voltage is noted. Then the battery was recharged 130% of capacity and discharged. This is repeated for ten cycles. The above said experiments are tested for expander doped base control negative cured plate, 1 wt % H-CNT doped Negative cured plate without Carbon black, Bariumsulphate and vanisperse and 0.35 wt % H-CNT without carbon Black and Vanisperse were tested. The life cycle capacity of Control and H-CNT doped negative electrodes of lead acid battery are shown in FIG. 9. From the FIG. 9 the H-CNT doped without Expanders has shown improvement of Reserve capacity and cycle capacity over base control expander doped lead acid battery.

EXAMPLE 13

Four Single cell lead acid batteries constructed using each single cell consists of 1 normal positive cured plates and 1 H-CNT doped negative cured plate without Dinel fibre dipped in sulphuric acid with the specific gravity of 1.28 to study the effect of H-CNT doped instead of Dinel fibre cured Negative plate for electrochemical performance (electrical conductivity of the NAM). The battery is charged using 0.5 A constant current for 16 hours using battery tester and the battery formation curve was plotted (Time Vs Voltage). For expander doped control negative cured plate the experiments repeated for same experimental conditions. The formation curve for H-CNT case without Dinel fibre and Control case is represented in FIG. 10. For 0.5 A current charging the maximum voltage reached for H-CNT without Dinel Fibre is 11.0 V but for the Control case the maximum voltage is 11.4 V. It indicates H-CNT without Dinel fibre case is less resistive than Control or more conductive than Control.

EXAMPLE 14

Four Single cell lead acid batteries constructed using each single cell consists of 1 normal positive cured plate and 1 negative cured plate dipped in sulphuric acid with the specific gravity of 1.28. The battery is charged using 0.5 A constant current for 16 hours using battery tester. After 16 hours of initial charging the battery is again charged with at constant voltage at 10.7 V for 10 hours. After charging the battery is discharged with 0.2 A constant current (Slow rate of discharge) with cutoff voltage 7V. After slow discharging the battery is charged with constant voltage at 10.7 V for 20 hrs. After 20 hrs charging the battery is discharged with high rate of current at 4 A (HRD) with cutoff voltage 6V. After High Rate of Discharge (HRD) the battery is charged with constant voltage for 10 hrs. This cycle is repeated for 3 times. After three cycles the battery is discharged for 5 hrs for 50% SOC (state of charge). At 50% of State of Charge (SOC) the battery is charged with 0.2 A for 1 hr and discharged with 0.2 A for 1 hr. The cycle is repeated up to cutoff voltage 6V. The total no of cycles noted to reach 6V for Control with expander in NAM and 0.1 wt %, 0.25 wt % H-CNT without expander cases in NAM. After cycle life test the NAM with 0.1 wt % H-CNT and Control NAM subjected to Scanning Electron Microscope (SEM). The SEM images are shown in FIG. 12.

TABLE 5

Cycle life test results of Control case Vs H-CNT without Expanders

| | Items | No of life Cycle | Percentage improvement in life cycle no |
|---|---|---|---|
| 1 | Base Control Expander doped-NAM | 7 | |
| 2 | H-CNT-0.1 wt %-NAM without expander | 19 | 171 |
| 3 | H-CNT-0.25 wt % NAM without expander | 23 | 228 |

TABLE 6

High Rate of Discharge (HRD) test of Control case Vs H-CNT without Expanders

| | Items | HRD capacity(AH) | Percentage improvement in HRD |
|---|---|---|---|
| 1 | Base Control expander doped-NAM | 0.66 | |
| 2 | H-CNT-0.1 wt %-NAM without expander | 0.79 | 20 |
| 3 | H-CNT-0.25 wt % NAM without expander | 0.86 | 31 |

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. An expander free electrode for lead acid battery comprising heteroatom embedded carbon nanotube (H-CNT) and lead oxide, wherein the heteroatom embedded carbon nanotube (H-CNT) comprises Sulphur in the range of 0.001 wt % to 1 wt % and wherein the electrode is having lead sulphate crystallite size in the range of 480 Å to 550 Å.

2. A lead acid battery comprising one or more electrodes as claimed in claim 1.

3. An expander free electrode for lead acid battery comprising heteroatom embedded carbon nanotube (H-CNT) and lead oxide, wherein the electrode is having penetration in the range of 3 dmm to 7 dmm.

4. The electrode as claimed in claim 3, wherein the heteroatom embedded carbon nanotube (H-CNT) comprises nitrogen in the range of 0.01 ppm to 2000 ppm.

5. A process for preparing an expander free electrode composition for lead acid battery, the process comprising:
 a) adding water drop wise to lead oxide to obtain lead oxide-water paste;
 b) dispersing the heteroatom embedded carbon nanotube (H-CNT) in sulphuric acid;
 c) mixing the product as obtained in step (b) with lead oxide-water paste of step (a);
 d) applying the product of step (c) in grid and curing for 72 hours to obtain expander free electrode for lead acid battery.

6. The process as claimed in claim 5, wherein the dispersion is done by sonification.

7. The process as claimed in claim 5, wherein the process is performed at a temperature in the range of 40° C. to 50° C.

8. The process as claimed in claim 5, wherein the heteroatom embedded carbon nanotube (H-CNT) is produced from crude oil or its products or mixture thereof.

9. The process as claimed in claim 8, wherein the crude oil or its products or mixture thereof comprises sulphur in the range of 0.001 wt % to 5 wt %.

10. The process as claimed in claim 8, wherein the crude oil or its products or mixture thereof comprises nitrogen in the range of 0.01 ppm to 5000 ppm.

11. The process as claimed in claim 5, wherein the heteroatom embedded carbon nanotube (H-CNT) comprises sulphur in the range of 0.001 wt % to 1 wt %.

12. The process as claimed in claim 5, wherein the heteroatom embedded carbon nanotube (H-CNT) comprises nitrogen in the range of 0.01 ppm to 2000 ppm.

* * * * *